(12) United States Patent
Klaghofer

(10) Patent No.: US 11,444,821 B2
(45) Date of Patent: Sep. 13, 2022

(54) METHOD FOR CONDUCTING AN AUDIO AND/OR VIDEO CONFERENCE

(71) Applicant: RingCentral, Inc., Belmont, CA (US)

(72) Inventor: Karl Klaghofer, Munich (DE)

(73) Assignee: RingCentral, Inc., Belmont, CA (US)

( * ) Notice: Subject to any disclaimer, the term of this patent is extended or adjusted under 35 U.S.C. 154(b) by 86 days.

(21) Appl. No.: 16/500,247

(22) PCT Filed: Apr. 12, 2018

(86) PCT No.: PCT/EP2018/059464
§ 371 (c)(1),
(2) Date: Oct. 2, 2019

(87) PCT Pub. No.: WO2018/189337
PCT Pub. Date: Oct. 18, 2018

(65) Prior Publication Data
US 2021/0120051 A1 Apr. 22, 2021

(30) Foreign Application Priority Data

Apr. 13, 2017 (DE) ..................... 10 2017 108 017.1

(51) Int. Cl.
| | |
|---|---|
| *H04L 65/60* | (2022.01) |
| *G06F 16/95* | (2019.01) |
| *H04L 12/18* | (2006.01) |
| *H04L 65/65* | (2022.01) |
| *H04L 65/403* | (2022.01) |

(52) U.S. Cl.
CPC ........ *H04L 29/06476* (2013.01); *G06F 16/95* (2019.01); *H04L 12/1813* (2013.01); *H04L 29/06517* (2013.01); *H04L 65/403* (2013.01); *H04L 65/60* (2013.01); *H04L 65/601* (2013.01); *H04L 65/608* (2013.01)

(58) Field of Classification Search
None
See application file for complete search history.

(56) References Cited

U.S. PATENT DOCUMENTS

| | | | | |
|---|---|---|---|---|
| 5,802,294 | A * | 9/1998 | Ludwig | G06Q 10/10 348/E7.081 |
| 6,418,214 | B1 * | 7/2002 | Smythe | H04M 3/56 379/202.01 |
| 7,369,515 | B2 * | 5/2008 | Salesky | G06F 3/1415 370/260 |

(Continued)

FOREIGN PATENT DOCUMENTS

| | | |
|---|---|---|
| DE | 102 96 696 T5 | 4/2001 |
| DE | 10296696 T5 | 4/2004 |

(Continued)

OTHER PUBLICATIONS

"WebrtcH4cKS: Your Browser as a Audio Conference Server with WebRTC & Web Audio", Alexey Aylarov, https://webrtchacks.com/web-audio-conference/ (Sep. 30, 2019).

(Continued)

*Primary Examiner* — Lance Leonard Barry
(74) *Attorney, Agent, or Firm* — Finnegan, Henderson, Farabow, Garrett & Dunner LLP

(57) ABSTRACT

A method for conducting audio and/or video conference, in which one of the terminals that is coupled to a central conference unit takes on the role of a media server, and this occurs under the control of said central conference control unit.

9 Claims, 4 Drawing Sheets

(56) References Cited

U.S. PATENT DOCUMENTS

| | | | |
|---|---|---|---|
| 7,653,013 B1* | 1/2010 | Moran | H04L 12/1822 370/261 |
| 7,899,170 B2 | 3/2011 | Jeong et al. | |
| 9,549,152 B1* | 1/2017 | Nayyar | H04N 7/148 |
| 2003/0026214 A1 | 2/2003 | Iveland et al. | |
| 2004/0210637 A1 | 10/2004 | Loveland | |
| 2006/0294186 A1* | 12/2006 | Nguyen | H04L 12/1822 709/204 |
| 2008/0069011 A1 | 3/2008 | Sekaran et al. | |
| 2012/0169836 A1* | 7/2012 | Setlur | H04L 12/1827 348/14.11 |
| 2014/0122600 A1* | 5/2014 | Kim | H04L 65/403 709/204 |
| 2015/0103131 A1* | 4/2015 | Denoue | H04N 7/147 348/14.03 |
| 2015/0161087 A1* | 6/2015 | Khoo | G06F 16/957 715/234 |
| 2016/0112472 A1* | 4/2016 | Pugalia | H04L 65/403 709/204 |
| 2016/0127199 A1* | 5/2016 | Ding | H04L 67/02 709/226 |
| 2017/0272488 A1* | 9/2017 | Totzke | H04L 67/02 |
| 2017/0359187 A1* | 12/2017 | Bettenbuk | H04N 7/147 |

FOREIGN PATENT DOCUMENTS

| | | |
|---|---|---|
| EP | 0 874 323 A1 | 10/1998 |
| EP | 0874323 A1 | 10/1998 |
| EP | 1001596 A2 | 5/2000 |
| WO | 2015135408 A1 | 9/2015 |

OTHER PUBLICATIONS

International Preliminary Report on Patentability for PCT/EP2018/059464 dated Oct. 15, 2019.

* cited by examiner

METHOD FOR CONDUCTING AN AUDIO AND/OR VIDEO CONFERENCE

CROSS-REFERENCE TO RELATED APPLICATIONS

The present application is the U.S. national stage application of International Patent Application No. PCT/EP2018/059464, filed on Apr. 12, 2018, claiming priority to German Patent Application No. 10 2017 108 017.1, filed on Apr. 13, 2017.

FIELD

The invention relates to a method for conducting an audio and/or video conference, in which multiple terminals are coupled to a central conference control unit via a data network. At least one predefined terminal of the terminals can comprise a data processing unit, which enables the terminal to participate in the conference by operating an application, particularly a browser application. Typically, such a predefined terminal is a personal computer with an installed camera and an installed microphone (or connected camera and microphone) and a screen as well as a speaker ([installed] or connected). The data processing unit can equally be an appropriately equipped tablet computer device, a smartphone or similar portable terminal. Using the browser, the personal computer (or other device) is conference-enabled: by using the camera, images are captured, by using the microphone, speech is recorded. The user's own image is displayed and/or the images of other participants are displayed on the screen, and speech output is delivered through the microphone.

BACKGROUND

The prior standard practice for audio and/or video conferencing was that multiple participants (clients) logged into the central conference unit using their browser, which is typically located in a cloud. This is explained by an example based on FIG. 1.

FIG. 1 shows a company network 10, in which individual clients EP 1, EP 2 and EP 3 (Web Real-Time Communication (WebRTC) browser, or web real-time control browser) wish to teleconference together and log in to a public cloud 12 on the central conference control unit K-A, where a conference application is running via WebRTC. The login occurs via signaling path 14, which is shown in FIG. 1 by solid lines. The signaling occurs from the individual clients or the browser EP 1, EP 2, EP 3 to the conference application K-A. The conference application K-A then provides a resource via which the audio and/or video conference can take place. This resource is called the media server, sometimes also the media node, and is abbreviated in FIG. 1 as "MS", short for media server. The individual audio and video data packets are transmitted via the data lines 16 (shown as dotted lines) to the media server MS, which mixes the audio and/or video conference data and sends it back again to the individual clients. Instead of mixing, a "selection" can also occur (i.e., a selection from the audio or video data channels, with transmission of the data streams received, and from the individual clients, for the purposes of processing the data streams in the clients themselves, which then are called selective forwarding units (SFU). For example, a respective speaking person can be displayed, and the muted persons are not selected, but instead filtered out.

The disadvantage to a procedure such as FIG. 1 is that the audio and video data leave the company network 10 for the purposes of the teleconference. This can necessarily put secure data exchange at risk. Moreover, more resources are required for the data transfer than if it were to take place within a network.

US 2014/0122600 A1 discloses a conference server that takes on the task of mixing the audio or video data. The individual browsers, running JavaScript, provide a corresponding capability to participate in the conference, but not via one's own mixer.

EP 1 014 666 A1 discloses a method to implement multipoint connections (i.e., conferences) between multiple terminals of an H.323 data communication network, in which the conferencing unit executes the opening of user data channels (i.e., of audio and video channels) between the terminals via the conferencing unit.

EP 1 001 596 A2 describes a multimedia terminal for telephony that itself enables multipoint connections.

US 2004/0210637 A1 describes the envisioning of external conference bridges in addition to other paths.

At the computer link https://Webrtchacks.com/web-audio-conference/ on Apr. 3, 2017, an article was available from which the principle emerged of a browser taking over the role of a central conferencing control unit to conduct local audio conferences. The article calls this a "poor man's conference solution" because no server is used. It is not known from the article how such audio conferencing can be accomplished.

SUMMARY

It is the object of embodiments of the present invention to provide a method for conducting an audio and/or video conference which preferably occurs using clients, provided via an application, particularly a browser application, and wherein the method achieves the most efficient possible use of the data networks and/or the most optimal security during the exchange of audio and/or video data (user data).

Embodiments of the invented method for conducting an audio and/or video conference, in which multiple terminals are coupled with a central conference control unit via a data network, and wherein at least one first terminal comprises a data processing unit, which enables the terminal to participate in the conference by running an application, particularly a browser application, can have the invented characteristic that a predefined terminal of the at least one first terminal receives audio and/or video data streams (i.e., user data streams) from other terminals upon meeting at least one predefined criterion based on control commands (signaling) by the central conference control unit, and:

a) mixes them by means of the application, particularly a browser application (particularly also with audio and/or video streams self-generated by the first terminal) and sends them back in mixed form to the other terminals and/or b) relays to the other terminals a selection of the received audio and/or video data and the audio and/or video data generated by the at least one first terminal.

Embodiments of the invention can be based on the principle of using a (central or distributed) media server outside of the clients, which typically is the case in central conferences; but in this case one of the clients (that is, the predefined terminal of the at least one first terminal) functions itself as the media server or media node, which normally is the case only in conferencing methods that do not involve a conference server. This allows the data exchange between the individual browsers and/or the associated terminals to occur, but without having to forgo the advantages of a central conference control unit (with corresponding conference room user experience, user authentication, etc.). If all terminals are located in the same company network, for example, security-sensitive audio and/or video data do not have to leave the company network. Otherwise, if the audio and video data between clients and a central WebRTC conference server are transmitted encrypted in WebRTC standard, then the audio packets must be decrypted, for example by the conference server (in the Cloud) to allow them to be mixed, then again re-encrypted and sent back to the clients. That means complete "end-to-end confidentiality" is often not ensured. It is apparent from this that, for reasons of confidentiality, it can be advantageous to keep the media data local in the local area network (LAN). Further advantages are the significant reduction of the required wide area network (WAN) bandwidth, that is, the bandwidth between the location/company network/clients and the data center of the Cloud service provider of the WebRTC conference solution.

The application is preferably a WebRTC (Web Real-Time Control) browser application, that is, a web real-time control browser application. It can thereby be set up based on the presence of WebRTC technology. The one predefined terminal of the at least one terminal must only be equipped with a suitable application plug-in. An application plug-in is not to be confused here with a browser plug-in, because WebRTC browsers (e.g., Google Chrome® browser, Mozilla Firefox® browser, etc.) do not require browser plug-ins by definition in W3C WebRTC standardization (World Wide Web Consortium), at least not for basic WebRTC functionality.

In one variation, the one at least one first terminal receives audio and/or video data streams from all other terminals and mixes them or subjects them to a selection. The entire conference is thereby in principle supported by the predefined one first terminal in regard to user data streams. This further preferably provides that all audio and video data streams are running exclusively via the predefined first terminal, so that there are no longer parallel user data streams. In this way, security can be ensured with appropriate placement of the clients and/or their browsers in a closed network (the company network, for example).

In another variation, the one at least one first terminal receives audio and/or video data streams from only a subgroup of the other terminals and mixes them or subjects them to a selection. In this case, a subconference can be conducted: Those participants that are sitting at terminals in a company network can communicate separately, for example to agree in regard to their conduct towards a participant outside of the company network with whom they are negotiating. Here also, the security-related data remains in the closed network, i.e., the company network.

It is therefore preferable that the predefined criterion—which when met initially causes the central conference control unit to make the predefined terminal of the at least one first terminal execute the receiving and mixing/selecting process—includes those other terminals from which audio and/or video data streams are received being coupled with each other in a common Local Area Network, LAN.

In one preferred embodiment of the invention, each terminal must log in to the central conference control unit to participate in the conference. The predefined terminal transmits (upon such a login) or transmitted (with an earlier first login) the information to the central conference control unit that it has been enabled to receive audio and/or video data streams and a) to mix and b) to process a selection and that the predefined criterion includes such information having been transmitted. In this way, the central conference control unit can generally be equipped so that it mixes the user data streams or subjects them to a selection process. Only when a terminal logs in with the appropriately configured browser, which it provides via a suitable browser extension to be able to conduct the conference itself, will this task be transferred to the corresponding browser.

In another aspect of the invention, a computer program product is provided to provide or extend (the latter in the form of a plug-in) an application, particularly a browser application on a first data processing unit. This computer program product can include code stored on a non-transitory computer readable medium (e.g. flash memory, a hard drive, etc.) that is configured to confer the capability to the first data processing unit to receive audio and/or video data from at least one second data processing unit and to mix and/or process a selection of audio and/or video data received, on one hand, from the second data processing unit and provided, on the other hand, by the first data processing unit and/or another second data processing unit, and to relay the mixed and/or selected audio and/or video data to the at least one second data processing unit. This computer program product therefore ensures that a browser is running which has the above-described properties, i.e., the central conference control unit accepting the task of mixing and/or conducting a selection from the audio and/or video data. In particular, the browser application can be enabled by the computer product to state during the initial login to the central conference control unit that the browser is capable of conferencing. The functionality of the computer program product can be defined by code that defines a method that is performed when a processor of the first data processing unit executes the code.

In a further aspect of the invention, a computer program product is provided to provide or extend (in the form of a plug-in) an application, particularly a browser application, to a second data processing unit that is configured to give the second data processing unit the capability to exchange control signals with a central data processing unit and to transmit audio and/video signals to a first data processing unit outside of the central data processing unit. This computer program product allows the browser, which itself is not conferencing-enabled, to use the conferencing-enabled browser application under the control of the central data processing unit. Functionality of the computer program product can be defined by code that defines a method that is performed when a processor of the second data processing unit executes the code.

The invention provides, in a still further aspect, a computer program product which serves to provide or extend (in the form of a plug-in) an application, particularly a conferencing application, to a third data processing unit and is configured to confer the third data processing unit with the capability to obtain information from a first data processing unit, which states that this first data processing unit is capable of receiving audio and/or video data from second data processing units and to mix and/or run a selection process and to transmit the mixed and/or selected audio and/or video data to additional data processing units, whereby the third data processing unit, upon receipt of such information, transfers the task of such mixing and/or running a selection process to the first data processing unit, which had transmitted the information.

Other details, objects, and advantages of the invention will become apparent as the following description of certain present preferred embodiments thereof and certain present preferred methods of practicing the same proceeds.

BRIEF DESCRIPTION OF THE DRAWINGS

Preferred embodiments of the invention are described in detail with reference to the drawings, in which.

DETAILED DESCRIPTION OF EXEMPLARY EMBODIMENTS

Figure 1:
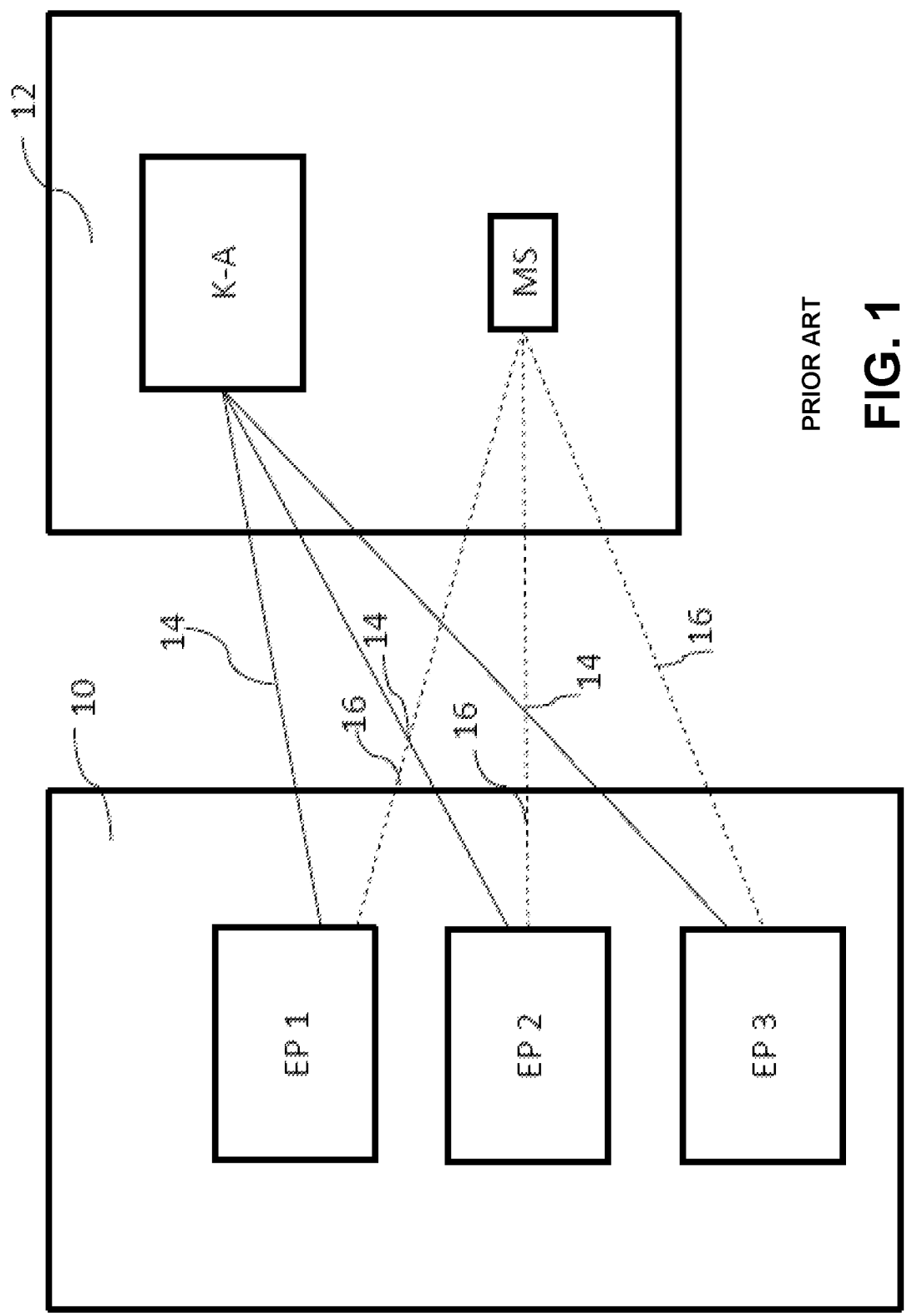
FIG. 1 shows an arrangement to conduct a conference that implements a method according to the prior art.
Figure 2:
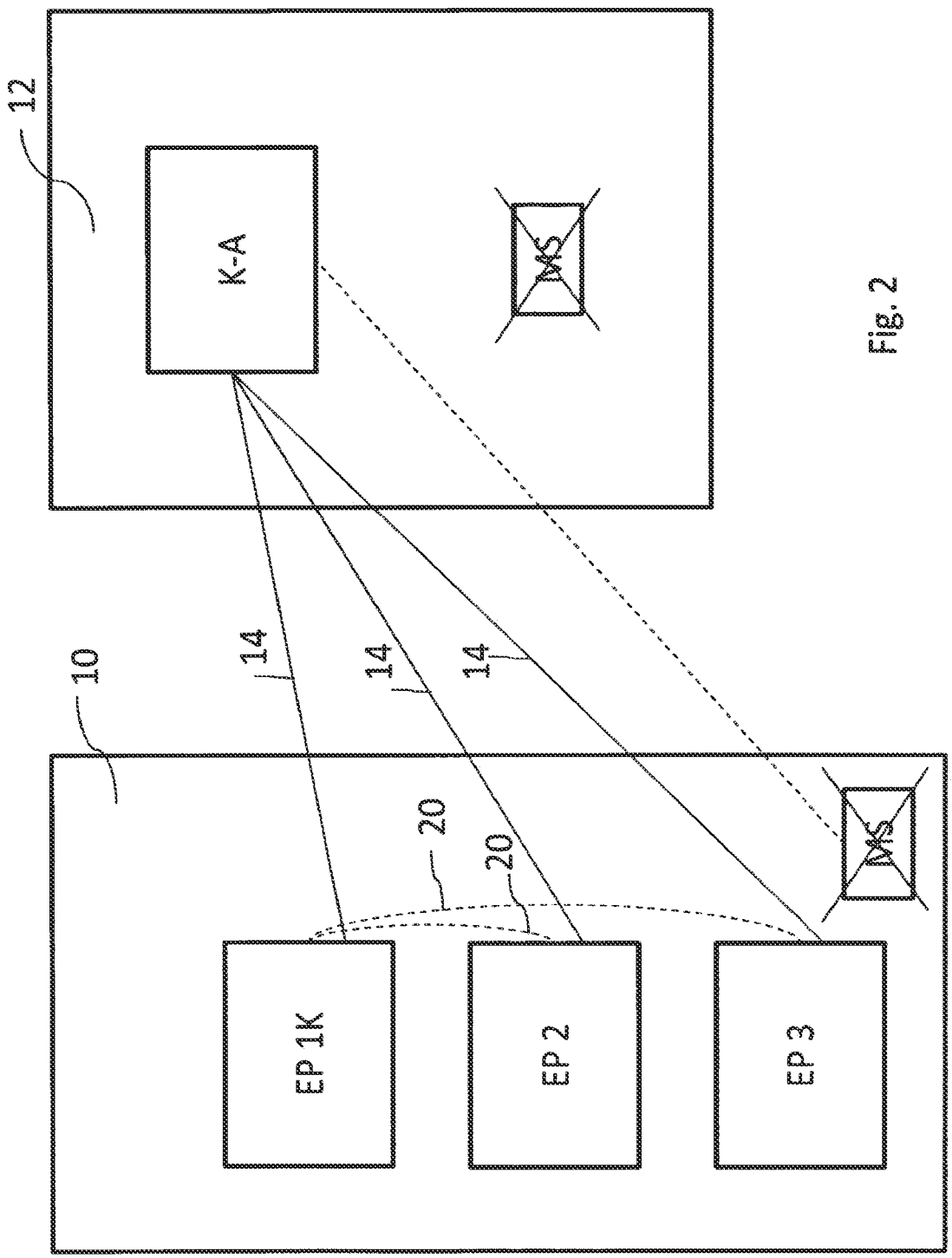
FIG. 2 shows an embodiment of an arrangement to conduct a conference that implements the invented method.

In the embodiment of the invented method shown based on FIG. 2, instead of a normal WebRTC browser, a type of WebRTC browser EP 1K is provided with a conferencing capability (conference resource). This conference resource is controlled by a central application (conference control application) that is drawing on the cloud WebRTC. In the company network 10, there are additional browsers EP 2 and EP 3. The conference application K-A is located on a cloud (data center) 12. As in the prior art, there are signaling paths 14 between the individual browsers EP 1K, EP 2 and EP 3 to the conference application K-A. However, these signaling paths do not extend to corresponding user data paths outside of the company network. In particular, there is no media server MS and no central media server is required for the described scenario. Instead, the browser EP 1K assumes the role of a media server or media node, and the user data streams (audio and/or video data) are transmitted via signal paths 20 by the individual additional browsers EP 2 and EP 3 to the conferencing-enabled browser EP 1K, mixed there and sent back again via the same path in mixed form. "EP" refers to "endpoint", which can include a communication terminal that includes a processor connected to non-transitory memory having one or more applications stored thereon that are executable via the processor. Each endpoint can be connected to one or more input devices (e.g. keyboard, pointer device, etc.) and one or more output devices (e.g. screen, printer, etc.). Each endpoint can be, for example, a desktop computer, a laptop computer, or other type of computer device (e.g. electronic tablet, smart phone, etc.). In some embodiments, a screen of the endpoint can be configured as a touch screen display that functions as an input/output device.

As an alternative or in addition to mixing, it is possible for a selection to be made by the conference-enabled browser EP 1K, so that, for example, whenever a participant is currently speaking, their image is displayed on the browsers, and otherwise not. The advantage of the procedure according to FIG. 2 lies in the fact that the user data streams remain on the company network 10. This provides for greater data security. Furthermore, less bandwidth is required between the company network 10 and the cloud data center 12.

Figure 3:
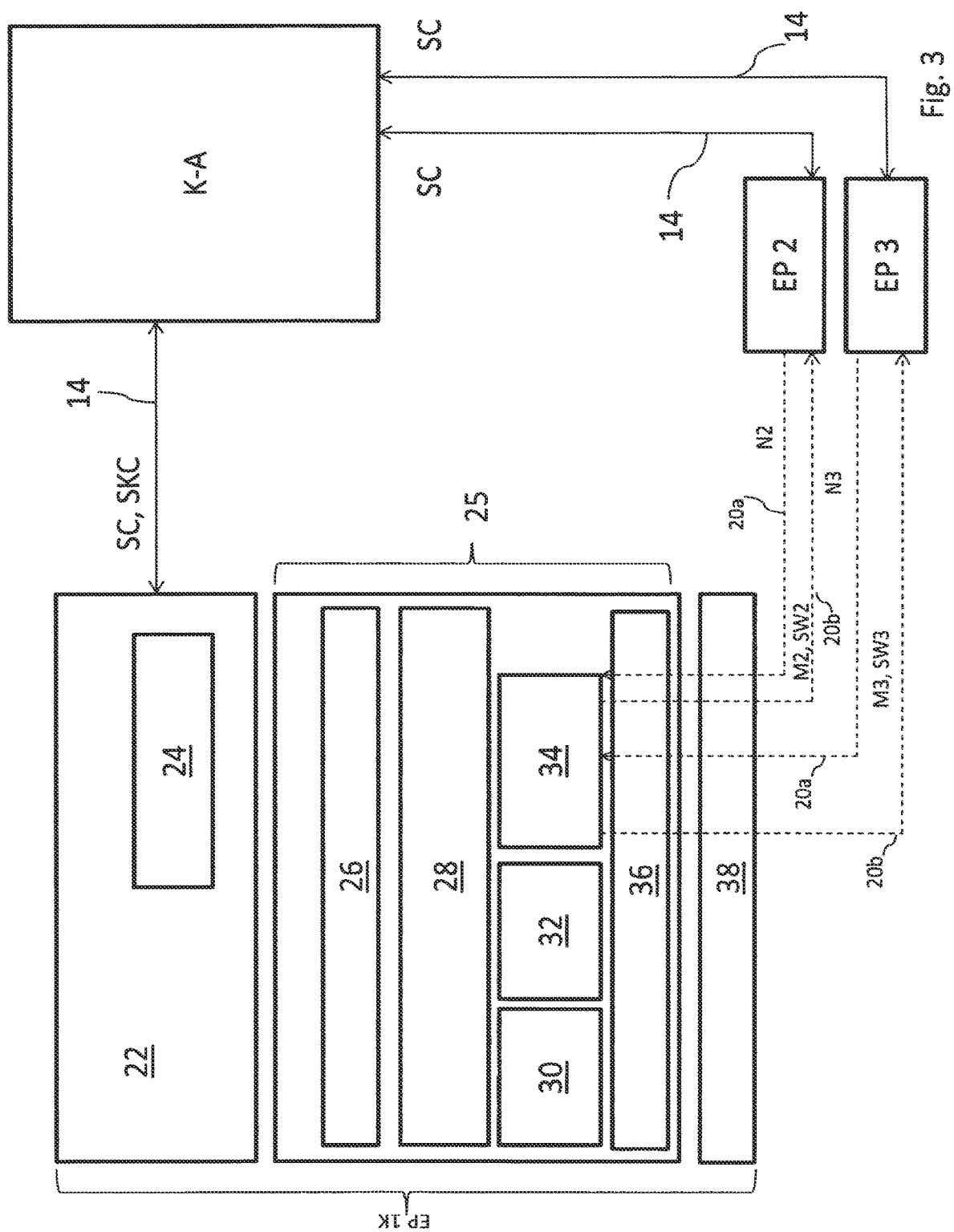
FIG. 3 shows details on the conferencing-enabled WebRTC browser and the data flow from and to this browser according to an embodiment of the invented method.

The configuration of conferencing-enabled browsers EP 1K is described in greater detail below using FIG. 3.

Initially it is provided via a client application, for example a JavaScript application 22, that gives it the capability to communicate with the central conference control application K-A. It can therefore take on the role of a client. As a plug-in or installed in the client application, a conferencing client application 24 is provided, possibly also in JavaScript, that gives the client the capability of signaling that it is conferencing-enabled. While the client application 22 generally responds to a WebRTC client signaling with the conference application K-A (see reference designation "SC" "Signaling Client"), the additional application 24 responds that an additional signaling of the conference client is occurring ("Signaling Conference Client", SKC), and for example also accepts the teleconferencing commands of the central conference control unit (media server role in EP1K).

The browser 25 comprises a web interface, particularly a web real-time control interface 26: WebRTC API, Web Real-Time Control Application Programming Interface. It comprises a unit for managing the session and the conference ("Session Management and Conference Management") 28. Furthermore, it requires a corresponding voice unit 30 ("Voice Engine" with corresponding codecs) for coding and decoding and the same for video data in the unit 32 ("Video Engine" with corresponding codecs). Examples of codecs are G.711, Opus, H.264, VP8, etc. In addition, there is a unit 34 for mixing and/or connecting (selecting, routing). The transmission interface (carrier interface) 36 provides for the routing of the data and assigns a client/browser OS interface to the additional browsers EP 2 and EP 3.

The browsers EP 2 and EP 3, (where EP stands for "end point," as discussed above, e.g., telecommunication participant), also exchange corresponding signals SC with the conference application K-A. By signaling SKC, the conference application decides that the browser EP 1K should conduct the media for the conference. In response, the browsers EP 2 and EP 3 transmit their user data N2 and N3 to the unit 34, where this user data N2 and N3 is mixed or undergoes selection with corresponding user data N1 generated by units 30 or 32, wherein the mixed data is sent back as data M2 and M3 or the selected ("switched") data is sent back as SW2 and SW3. The signal path 20 displayed in FIG. 2 is divided here into the two paths 20a, in the direction of unit 34, and 20b in the direction from unit 34 to the browsers EP 2 and EP 3.

Figure 4:
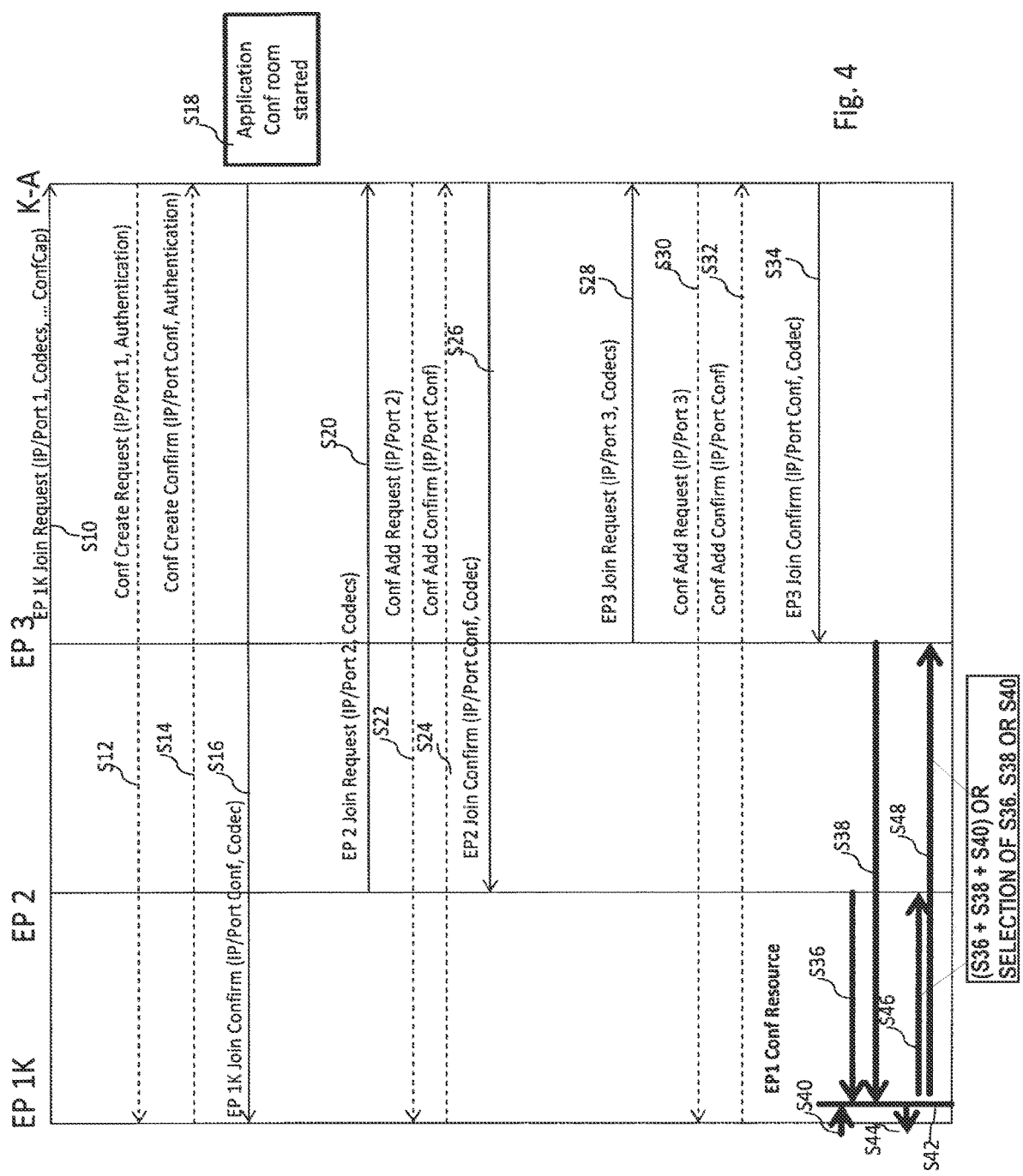
FIG. 4 shows a flow sequence of the exchange of messages according to an embodiment of the invented method.

The data exchange can be explained in detail as shown below:

FIG. 4 shows the corresponding signals:

Initially, in a Step S10, the query is sent by the browser EP 1K to the conference control application K-A to enter the conference room or to initiate it (see "EP 1K JoinRequest") in FIG. 4). Part of the signaling content in Step S10 is, for example, the IP address and port of client EP 1, the supported codecs as well as additional conference-related capabilities of Client 1 ("ConfCaps"=conference capabilities). Based on the signaling, the conference application K-A identifies that the client/browser EP 1K has the capability to support local browser conferences, including conference detail capabilities. These signaled conference detail capabilities (ConfCaps) include, for example: 1) Conference type (audio conference, video conference, screen share conference (mostly video), 2) Conference mode (conference mixing, selective forwarding unit, etc.), supported codecs (G.711, OPUS, H.264, VP8, VP9, etc.), Conference Credentials (for authentication).

In the next Step S12, the conference application K-A asks the browser EP 1K (in its role as "Media Node") to provide a corresponding media resource in EP 1K (see "Conf Create Request" in FIG. 4). The IP address and port for client 1 are signaled together in Step S12 to the browser media resource. The browser EP 1K responds (in its role as "Media Server") in Step S14 with the confirmation that it has the requested media resource(s) available and signals the IP address/port of the WebRTC browser conference resource as part of Step S14. This is shown in FIG. 4, in the command "Conf Create Confirm," which contains information that is sent to conference application K-A that the browser EP 1K has started the media resource or provided the conference resources. In Step S16, the conference control application K-A then confirms to the browser EP 1K (in its role as "Client/WebRTC browser") that a media resource was generated and the client EP 1K can send to this media resource ("EP 1K Join Confirm"). With that, as shown in Step S18, the application conference room is active, with one participant (EP 1K) in the conference and the option available for additional WebRTC browsers to enter.

In Step S20, the browser EP 2 asks whether it can enter the conference ("EP 2 Join Request"). The browser EP K1 (in its role as "Media Server") receives the request then in Step S22 from the conference control unit to connect EP2 into the conference (Conf Add Request) and confirms this on its side in Step S24 ("Conf Add Confirm"). At that point, the conference application K-A sends confirmation to the browser EP 2 in Step S26 that the conference with EP 1K was entered. Like the Steps S10, S12, S14, S16, in regard to the exchange of the IP and port receiving address between client EP 1K and the conference resource (in client EP 1K), the receiver IP addresses and ports are exchanged in the Steps S20, S22, S24 and S26 also between EP2 and the conference resource (in EP 1K).

Corresponding Steps S28, S30, S32, and S34 also occur with the third browser EP 3. After completing the Steps S26 and/or S34, the browsers EP 2 and EP 3 then send their audio and video data in the Steps S36 and S38 to the conference resource of the browser EP 1K. The arrow S40 shows that the browser EP 1K internally (in its role as client) contributes its own audio and video data for mixing, which was recorded with the assigned microphone or the assigned camera. The Client EP 1K does not have to send its locally expressed media data via the LAN interface (IP address) to the media resource of the same EP 1K, but can perform this internally in the browser. In the mixing Step S42, the user data received is mixed in such a way that corresponding data can be issued in Step S44 to the browser EP 1K itself or can be transmitted in Steps S46 and S48 to the browsers EP 2 and EP 3 and can be issued from there.

The browsers shown in the figures to this point are all conference participants, each running on a respective communication device (e.g. a communication terminal such as a laptop computer, personal computer, etc.). The invention is then also applicable if a conference is already ongoing and only one subgroup in a company network would like to conduct a subconference. In this case, the requesting user needs the appropriate authorization and graphical user interface (GUI) controls on his browser client (e.g. "Split Local Conference"), connected with the corresponding payload reconfiguration orders, sent via the central conference control application.

While certain present preferred embodiments of the communication apparatus, communication system, communication device, non-transitory computer readable medium, and embodiments of methods for making and using the same have been shown and described above, it is to be distinctly understood that the invention is not limited thereto but may be otherwise variously embodied and practiced within the scope of the following claims.

The invention claimed is:

1. A method for conducting a conference, in which multiple terminals are coupled via a data network with a central conference control, the method comprising:
using a conferencing-enabled browser for transmitting to the central conference control, information indicating that a first terminal of the multiple terminals and associated with the conferencing-enabled browser is running an application that enables the first terminal to support local browser conferences;
determining that the conferencing-enabled browser is capable of assuming a role of a media server, wherein the determination that the conferencing-enabled browser is capable of assuming the role of a media server is based on a conference type, a conference mode, supported codecs, and conference credentials for authentication;
receiving, by the conferencing-enabled browser of the first terminal, a confirmation from the central conference control that the conferencing-enabled browser of the first terminal can assume the role of a media server;
receiving, by the conferencing-enabled browser of the first terminal, audio and/or video data streams from conferencing-enabled browsers of other terminals of the multiple terminals based on control commands from the central conference control;
performing, by the conferencing-enabled browser of the first terminal, one of:
mixing the received audio and/or video data streams and sending the mixed audio and/or video data streams back to the conferencing-enabled browsers of the other terminals, or
selecting at least one audio and/or video stream received from at least one of the conferencing-enabled browsers of the other terminals and sending the selected at least one audio and/or video data stream to the conferencing-enabled browsers of the other terminals.

2. The method of claim 1, wherein the application running on the conferencing-enabled browser of the first terminal is a web real-time control (WebRTC) browser application.

3. The method of claim 1, wherein the conferencing-enabled browser of the first terminal receives and mixes and/or processes a selection of audio and/or video streams from the conferencing-enabled browsers of the other terminals.

4. The method of claim 1, wherein the first terminal is a computer device and the other terminals are computer devices.

5. The method of claim 1, wherein all the audio and/or video data streams of the conference are mixed by the conferencing-enabled browser of the first terminal.

6. The method of claim 1, wherein the conferencing-enabled browser of the first terminal receives and mixes and/or processes a selection of audio and/or video data streams from a subgroup of the conferencing-enabled browsers of the other terminals.

7. The method of claim 1, wherein the other terminals from which audio and/or video data streams are received are coupled to each other in a common local area network (LAN).

8. The method of claim 1, wherein a conferencing-enabled browser of each terminal must log in to the central conference control to participate in the conference.

9. A non-transitory computer readable medium having an application stored thereon that is executable by a computer device associated with a first terminal, the application enabling the computer device to initiate a conference and defining a method performed by the computer device when a processor of the computer device runs the application, the method comprising:

using a conferencing-enabled browser for transmitting to the central conference control, information indicating that the first terminal associated with the conferencing-enabled browser is running an application that enables the first terminal to support local browser conferences;

determining that the conferencing-enabled browser is capable of assuming a role of a media server, wherein the determination that the conferencing-enabled browser is capable of assuming the role of a media server is based on a conference type, a conference mode, supported codecs, and conference credentials for authentication;

receiving, by the conferencing-enabled browser of the first terminal, a confirmation from the central conference control that the conferencing-enabled browser of the first terminal can assume the role of a media server;

receiving, by the conferencing-enabled browser of the first terminal, audio data and/or video data from conferencing-enabled browsers of one or more communication terminals to which the computer device is connectable; and performing, by the conferencing-enabled browser of the first terminal, one of:

mixing the audio data and/or video data received with audio data and/or video data of the communication device to relay the mixed audio and/or video data to conferencing-enabled browsers of the communication terminals, or processing a selection of the audio and/or video data received and the audio and/or video data of the communication device to relay the selection to the conferencing-enabled browsers of the communication terminals.

* * * * *